UNITED STATES PATENT OFFICE.

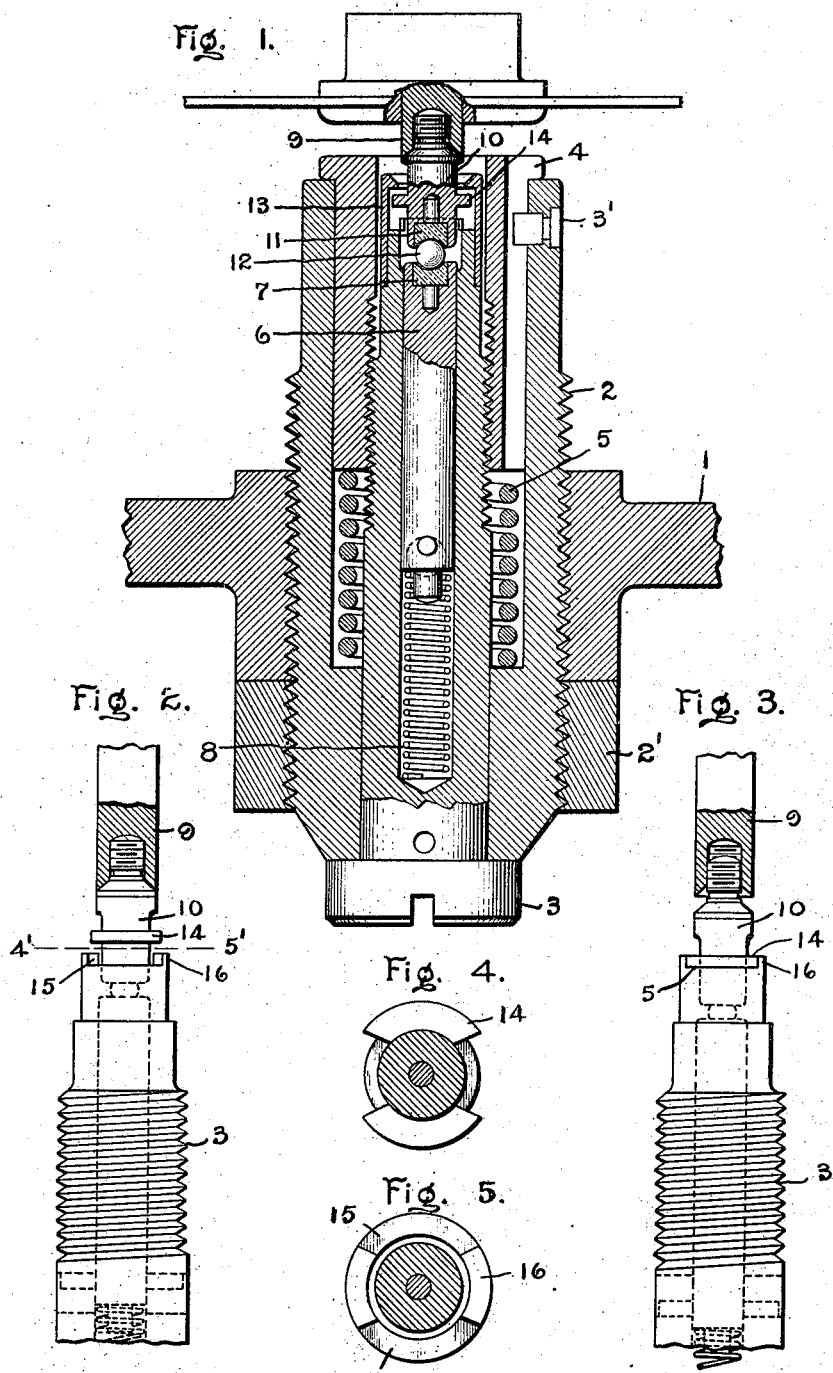

WILLIAM H. PRATT, OF LYNN, MASSACHUSETTS, ASSIGNOR TO GENERAL ELECTRIC COMPANY, A CORPORATION OF NEW YORK.

BEARING FOR ELECTRIC METERS.

1,022,503.  Specification of Letters Patent.  Patented Apr. 9, 1912.

Application filed January 25, 1910. Serial No. 539,916.

*To all whom it may concern:*

Be it known that I, WILLIAM H. PRATT, a citizen of the United States, residing at Lynn, in the county of Essex, State of Massachusetts, have invented certain new and useful Improvements in Bearings for Electric Meters.

My invention relates to bearings for electric meters and has for its object an improved form of construction for the same.

Electric meters, and more especially integrating meters, which may have a rotating armature are usually provided with a lower thrust bearing upon which the armature rests. This bearing is sometimes a ball bearing, that is, the lower part of the meter shaft bears against a small sphere or ball. It is often necessary to remove the bearing for the purposes of inspection or replacement and the object of my invention is to provide a bearing which shall be readily removable from the meter and also insure that the ball shall not be lost during the process.

The further novelties of my invention are pointed out with more particularity in the claims annexed to and forming a part of this specification.

For a further understanding of my invention reference may be had to the accompanying drawings where—

Figure 1 shows on a large scale and partially in section a vertical view of my bearing attached to the casing of an electric meter, only a portion of the casing and the mechanism of the meter being shown; Fig. 2 is a vertical view partly in section of a portion of the meter shaft and a portion of my bearing for one position of the shaft; Fig. 3 is a view similar to that of Fig. 2 but for a different position of the shaft; and Figs. 4 and 5 are cross-sections of the lower bearing pin attached to the shaft.

Referring first to Fig. 1, the lower portion of the casing of the meter is shown at 1 and threaded into this in the usual manner is the bearing post 2, which may be locked in position to the meter casing by the lock nut 2'. Inside this post is the hollow member 3 which is threaded for a portion of its exterior and engages with a cylinder 4 sliding inside the post 2 and having a flange at its upper end. This cylinder rests against a spring 5 and is kept from turning by the pin 3' which engages with a vertical groove formed in cylinder 4 in the well known manner. Cylinder 4 serves as a shipping device for lifting the armature from its lower bearing by turning screw 3 and releasing spring 5 in the well known manner. Within the hollow fixed screw 3 is a lower bearing plug 6 which has the jewel 7 set in its upper end. This plug is spring supported by spring 8. Screwed to the lower end of meter shaft 9 is the upper bearing pin 10 which has inserted in it jewel 11. Between these two jewels is the ball or sphere 12 which serves to form a ball bearing in the well known manner. The top of member 3 is turned down slightly and over this is slipped a cap 13 which is held by friction to member 3 and serves to inclose the ball with its bearing surfaces and to prevent the loss of the ball when the bearing pin is removed from the meter shaft.

Referring to Figs. 2, 4 and 5, the bearing pin is formed with ears 14. The upper end of the member 13 has formed in it indentations 15 between the lugs 16 that are adapted to engage with the ears 14 of the bearing pin when the meter shaft is pushed down. These ears and indentations may best be seen by referring to Figs. 4 and 5 which are sectional views taken along the line 4' 5' of Fig. 2. Fig. 4 is a section of the bearing pin above this line and Fig. 5 a section below the same.

Fig. 3 shows the relation of the bearing pin, with its ears, to the fixed member 3 when the shaft is in its lowered position. It will be seen that when the meter shaft is pressed downward it will compress spring 8 and with a slight movement of the shaft the ears on the bearing pin may be made to engage the indentations 15. The bearing pin may then be unscrewed from the meter shaft by turning it or member 3 as the ears will be held against lugs 16. After the bearing pin has been unscrewed, the bearing may be removed from the meter casing, cap 13 taken off the upper end of member 3 and the ball and jewel bearings be readily removed, examined and replaced without losing the ball.

While I have described a preferred embodiment of my invention, I do not limit myself to this embodiment but seek in the appended claims to cover all such embodiments as will be obvious to those skilled in the art and will not depart from the spirit of my invention.

What I claim as new and desire to secure by Letters Patent of the United States, is—

1. A bearing for an electric meter shaft, comprising the shaft, an upper bearing pin attached thereto and having ears, a fixed hollow member having indentations adapted to engage said ears and a lower bearing plug yieldingly supported in said fixed member.

2. A bearing for an electric meter shaft, comprising the shaft, an upper bearing pin attached thereto and having ears, a fixed hollow member having indentations adapted to engage said ears, a lower bearing plug yieldingly supported in said member and a cap surrounding the bearing surfaces.

3. A bearing for an electric meter shaft, comprising the shaft, an upper bearing pin screwed into the lower end of said shaft and having ears, a fixed hollow member having indentations adapted to engage said ears and a lower bearing plug spring-supported in said member.

4. A bearing for an electric meter shaft, comprising the shaft, an upper bearing pin screwed into the lower end of said shaft and having ears, a fixed hollow member having indentations adapted to engage said ears, a lower bearing plug spring-supported in said member, a ball between the pin and the plug forming a ball bearing therewith, and a cap inclosing the ball.

5. A bearing for an electric meter shaft, comprising the shaft, an upper bearing pin screwed into the lower end of said shaft and having ears, a fixed hollow member having indentations at its upper end adapted to engage said ears, a lower bearing plug movable in said member, a spring supporting said plug in said member, a ball between the pin and plug forming a ball bearing therewith, and a cap removably attached to the upper end of the fixed member inclosing the ball and its bearing surfaces.

In witness whereof, I have hereunto set my hand this twenty-first day of January 1910.

WILLIAM H. PRATT.

Witnesses:
JOHN A. MCMANUS, Jr.,
CHARLES A. BARNARD.